Feb. 26, 1957 G. A. BLEVENS 2,782,542
PICTURE MOUNTS
Filed Jan. 8, 1953 3 Sheets-Sheet 1

GILBERT A. BLEVENS
INVENTOR.

BY
ATTORNEYS

Feb. 26, 1957 G. A. BLEVENS 2,782,542
PICTURE MOUNTS
Filed Jan. 8, 1953 3 Sheets-Sheet 2

GILBERT A. BLEVENS
INVENTOR.

BY
ATTORNEYS

Feb. 26, 1957  G. A. BLEVENS  2,782,542
PICTURE MOUNTS

Filed Jan. 8, 1953  3 Sheets—Sheet 3

GILBERT A. BLEVENS
INVENTOR.

BY
ATTORNEYS

United States Patent Office 2,782,542
Patented Feb. 26, 1957

2,782,542
PICTURE MOUNTS

Gilbert A. Blevens, Chicago, Ill., assignor, by mesne assignments, to Taprell Loomis, Inc., Rochester, Mich., a corporation of Michigan Application January 8, 1953, Serial No. 330,321

3 Claims. (Cl. 40—152.1)

The present invention relates to picture mounts, and it has as its principal object the provision of a picture mount which may be readily and easily folded in a flat form to facilitate handling and/or shipping.

Another object of the invention is the provision of a mount which may be quickly and easily moved to picture-displaying position.

Still another object of the invention is the provision of a mount which permits ready insertion and removal, or replacement of a photograph or picture which is to be viewed.

Yet another object of the invention is the provision of a mount provided with a picture-receiving pocket in which the picture is positioned loosely, but is securely held by a simple form of pocket-closing member.

A still further object of the invention is the provision of a picture mount which is formed from sheet material, desirably cardboard, and that is easy to use and assemble and is highly effective in its results.

To these and other ends, the invention idea resides in certain improvements and combinations of parts, all as will be hereinafter more fully described, the novel features being pointed out in the claims at the end of the specification.

In the drawings.

Similar reference numerals throughout the various views indicate the same parts.

The present invention relates to an arrangement of a scored and folded sheet of cardboard, or similar sheet material, which may be formed to provide a picture mount.

Figure 1:
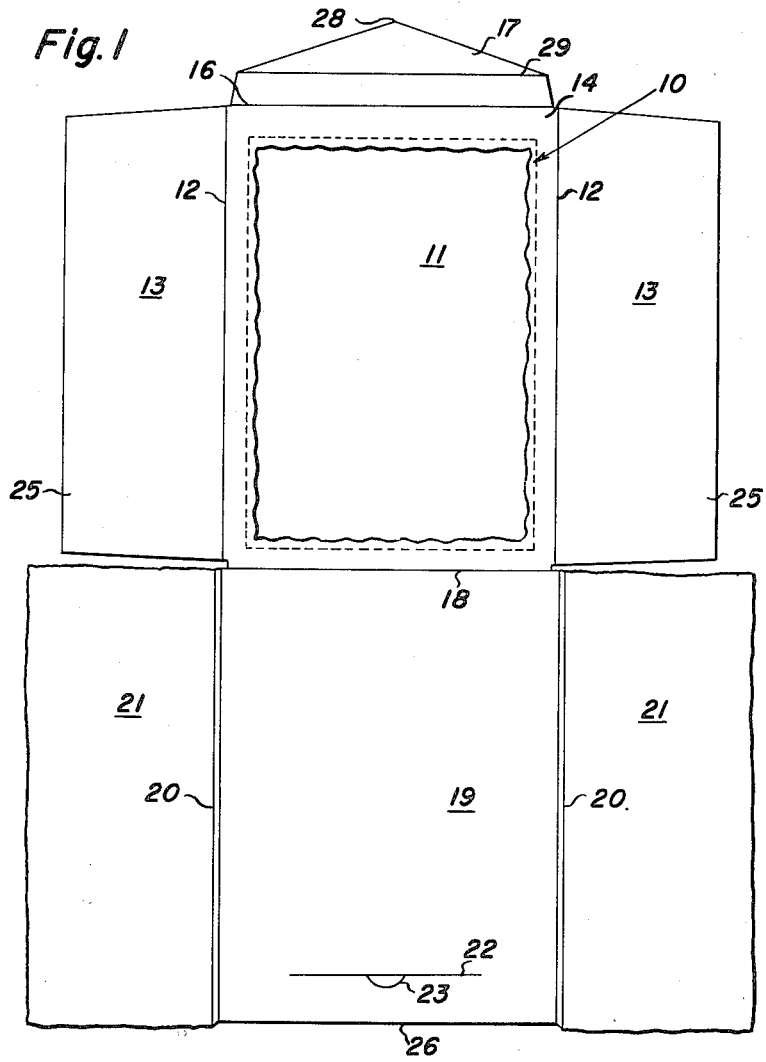
Fig. 1 is a plan view of a blank from which the picture mount of the present invention may be formed.
Figure 2:
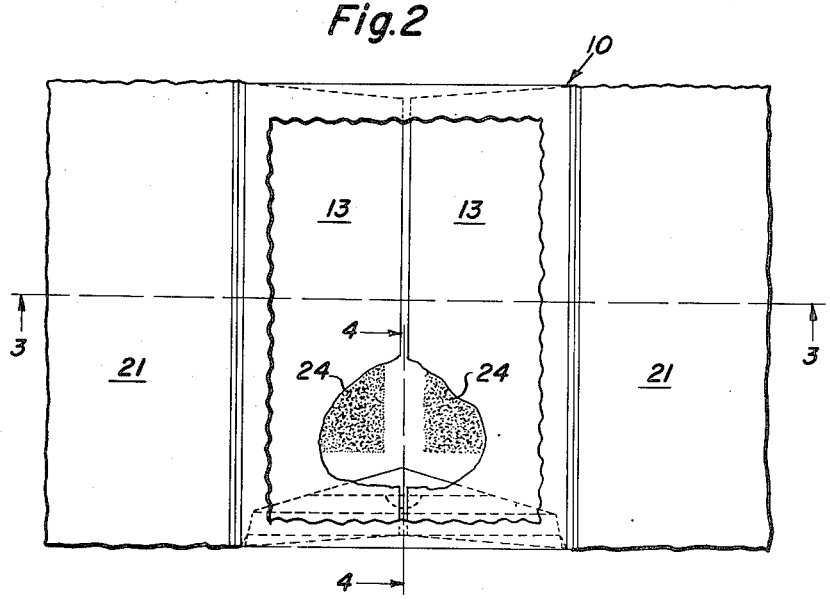
Fig. 2 is a view similar to Fig. 1, but with the blank folded to form the picture-receiving pocket.
Figure 5:
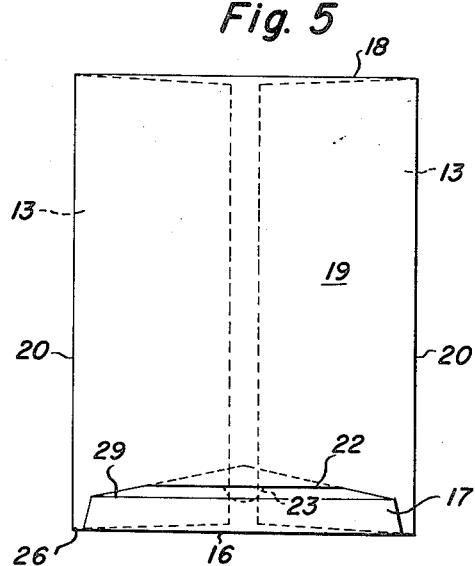
Fig. 5 is a back view of the completely assembled mount which is formed from the blank shown in Fig. 1.
Figure 6:
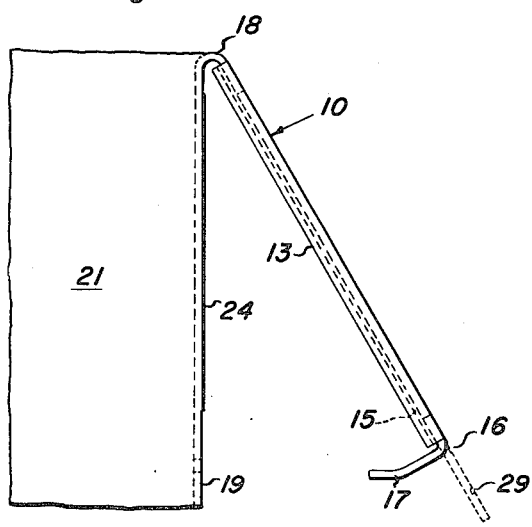
Fig. 6 is a side elevation view of a partially folded mount, showing the arrangement of the parts, one of the side flaps of the body panel being folded back and out of the plane of the panel.

In carrying out the present invention, a sheet of cardboard, or similar sheet material, is formed to provide a rectangular picture panel 10, the central portion of which is cut out to afford a viewing aperture 11 through which the picture may be seen, as will be later pointed out. The cardboard sheet is scored along parallel lines 12 to provide a pair of side flaps 13 which are hingedly connected to the opposite side edges of the picture panel 10, as clearly illustrated in Fig. 1. These side flaps 13 are adapted to be folded inwardly on lines 12 so that both flaps will overlie the rear side or face 14 of the picture panel 10. When so folded, the flaps 13 cooperate with and are spaced slightly from the adjacent face 14 of the picture panel 10 to provide a picture-receiving pocket 15, as clearly illustrated in Figs. 3 and 4. It will be observed from Figs. 2 and 3 that the aggregate width of the flaps 13 is within the width of the picture panel 10. Therefore, when the flaps 13 are folded as above described, they will occupy a common plane throughout their areas and provide a smooth rear wall for the picture-receiving pocket 15. The cardboard sheet is also scored along line 16 to form an end flap or tongue 17 which is hingedly connected to the top edge of the picture panel 10 as shown in Fig. 1. When the flaps 13 have been folded over the picture panel 10 to form the pocket 15, the end flap or tongue 17 may be swung about the scored line 16 and out of the plane of the picture panel 10 to close one end of the pocket 15, as shown in Figs. 2, 5 and 6, and later more fully described.

In the mount, Figs. 1–6, the picture panel 10 may be connected by means of a hinge or score line 18 to a rectangular body panel 19, desirably slightly greater in width than the picture panel 10, and which is preferably formed integral with the picture panel 10. In addition, the body panel 19 is also provided with parallel scored lines 20 in substantial alignment with the score lines 12 to form a pair of laterally extending side flaps 21 which are hingedly connected to the opposite side edges of the body panel 19, as clearly illustrated in Fig. 1. The lower end of the body panel 19 is formed with a slot 22 and an aperture 23, the purpose of which will be later more fully described.

Figure 3:
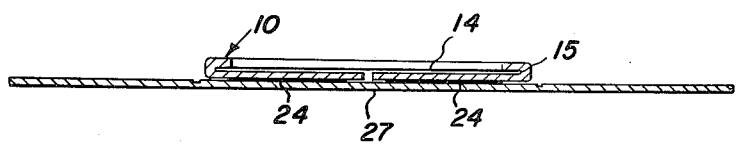
Fig. 3 is a transverse sectional view taken through the folded mount, illustrated in Fig. 2, and substantially on line 3—3 thereof, showing the relation of the picture-receiving pocket to the other elements of the structure.
Figure 4:
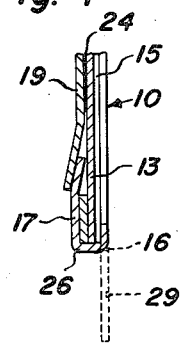
Fig. 4 is a longitudinal sectional view taken through a portion of the folded mount, illustrated in Fig. 2, and substantially on line 4—4 thereof, showing the arrangement of the closure flap for closing one end of the picture receiving pocket.

The mount may be shipped and/or stored in its unfolded or knocked down condition, illustrated in Fig. 1. When, however, it is to be used as a mount it is folded as follows:

First, the two side flaps 13 are folded about the score lines 12 to overlie the rear side 14 of the picture panel 10 and to cooperate therewith to form a picture pocket 15, as best shown in Figs. 3 and 4. After the flaps 13 have thus been folded over the picture panel 10, a layer of adhesive 24 may be applied to the exposed face of the flaps 13, or alternatively to the body panel 19. The folded assembly is then bent or swung about the score line 18 to bring the adhesive coated faces of the flaps 13 into engagement with the adjacent surface of the body panel 19, as shown in Fig. 3. When the parts are folded about the score line 18, the picture panel 10 and the body panel 19 cooperate to close one end of the picture-receiving pocket 15. The pocket 15 is, however, open at the end adjacent the lower edge 26 of the body panel 19. The picture or other object to be viewed may then be inserted into the pocket 15 through the open end and into position between flaps 13 and the panel 10. In this position the aperture 11 will serve to frame the image bearing area of the picture.

After the picture has been inserted in the pocket 15, the tongue or end flap 17 is swung about the score line 16 and bent downward out of the plane of the picture panel 10. The tongue 17 is then folded down over the lower edge 26 of the body panel 19 to close the other, or lower, end of the pocket 15 as is deemed apparent. The tongue 17 is then brought over the rear surface of the body panel 19 and the point 28 of the tongue is inserted through the aperture 23 to position the tongue 17 in the slot 22. The latter frictionally engages the tongue 17 with sufficient force to retain the tongue in the slot 22 to hold the tongue in pocket-closing position. The presence of the aperture 23 facilitates the ready insertion of the point 28 in the slot. To further facilitate the ease and ready insertion of the tongue 17 in the slot 22, the tongue 17 is formed with a second score line 29 parallel to the score line 16, so that the tongue may be bent about the second score line to bring the point 28 into closer proximity to the aperture 23. Then, by flattening out the tongue the latter is slid into the slot 22.

Both ends of the pocket 15 are now closed and the picture, not shown, is held loosely yet securely therein. However, if it is desired to remove and/or replace the picture, it is merely necessary to withdraw the tongue 17 from slot 22 and to swing the tongue to the dotted line position illustrated in Fig. 4 and into the plane of the picture panel 10 to open the lower end of the pocket 15. The old picture may then be removed and a new picture inserted in the pocket. Then the tongue may be swung to pocket closing position, and the end thereof inserted in slot 22 again to close the lower end of the pocket.

If the assembled mount, with or without the picture, is to be stored or shipped, it is only necessary to swing the flaps 21 upwardly about the score line 20, as viewed in Fig. 3, so that flaps 21 will overlie the top or exposed surface of the picture panel 10. In this position the flaps 21 will serve to protect the picture against damage. However, when the picture is to be exposed for viewing, the flaps 21 are folded about the score lines 20 substantially to the position illustrated in Fig. 3, to expose the picture positioned in the pocket 15. In this position, the body panel 19 and the flaps 21 lie in substantially a single plane, as shown in Fig. 3. The opened mount may then be placed in a suitable supporting member. If desired, the flaps 21 may then be bent still further about the score lines 20 to a position below that illustrated in Fig. 3 in which the flaps will lie out of the plane of the body panel 19. The bent flaps and the body panel will then provide a plurality of non-aligned members which will provide a self-supporting structure, the advantages of which are deemed apparent.

What I claim and desire to secure by Letters Patent of the United States is:

1. A picture mount formed from a single piece of cardboard to provide an apertured picture panel, side flaps hingedly secured to opposite side edges of said panel and foldable over one side thereof and cooperating therewith to provide a picture receiving pocket positioned between facing surfaces of said panel and flaps, the aggregate width of the flaps being within the width of said picture panel, a body panel slightly wider than the picture panel having an end edge hingedly connected to one end edge of said picture panel and cooperating therewith to close one end of said pocket, said body panel being folded to overlie the side of said folded flaps remote from said pocket, means for securing said body panel to said flaps to retain the parts in assembled relation, a tongue hingedly connected to the end edge of said picture panel opposite said one end edge, said tongue being foldable over the end of said flaps and the end edge of said body panel opposite that connected to said picture panel to close the other end of said pocket, said body panel being formed with a slit adapted to receive said tongue, edges of said slit frictionally engaging said tongue in position in said slit to releasably hold said tongue in pocket closing position, and side flaps of an aggregate width greater than the width of the body panel hingedly connected to opposite side edges of said body panel and adapted to be folded over said picture panel.

2. A picture mount constructed of cardboard and comprising an apertured rectangular picture panel, flaps connected to opposite edges of said panel and extending inwardly from said edges over the rear side of the picture panel and cooperating therewith to provide a picture-receiving pocket positioned between facing surfaces of said panel and flaps, the aggregate dimension of said flaps between said edges being within the corresponding dimension of the picture panel so that said flaps lie in a common plane throughout their areas, a rectangular body panel of approximately the same size as the picture panel connected along one of its edges to one of the remaining edges of the picture panel, said body panel overlying the rear sides of said flaps, adhesive means fastening the body panel to said flaps in face to face relationship, and a tongue hingedly connected to the edge of the picture panel remote from the edge thereof that is connected to an edge of the body panel, said tongue being adapted to be folded about the adjacent end of the body panel, said body panel having a slot by which said tongue is adapted to be tightly received so that the tongue will be frictionally and therefore detachably held in a position to close the picture-receiving pocket.

3. In a picture mount, the combination and arrangement of parts set forth in claim 2, and, in addition thereto, flap means hingedly connected to the body panel in edge to edge relation thereto and adapted to be folded over the picture panel.

References Cited in the file of this patent

UNITED STATES PATENTS

| | | |
|---|---|---|
| 911,794 | Williams | Feb. 9, 1909 |
| 1,421,097 | Pente | June 27, 1922 |
| 1,524,338 | Chesney | Jan. 27, 1925 |
| 1,839,814 | Taylor | Jan. 5, 1932 |
| 2,443,645 | Turan | June 22, 1948 |

FOREIGN PATENTS

| | | |
|---|---|---|
| 24,547 | Great Britain | Nov. 10, 1902 |